United States Patent
Kim et al.

(10) Patent No.: US 8,230,599 B2
(45) Date of Patent: Jul. 31, 2012

(54) METHOD OF MANUFACTURING HYDRODYNAMIC BEARING

(75) Inventors: Young Tae Kim, Seoul (KR); Jin San Kim, Gyunggi-do (KR); Young Hwan Lim, Gyunggi-do (KR); Il Oung Park, Seoul (KR); Ta Kyoung Lee, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 626 days.

(21) Appl. No.: 12/285,879

(22) Filed: Oct. 15, 2008

(65) Prior Publication Data

US 2010/0005662 A1    Jan. 14, 2010

(30) Foreign Application Priority Data

Jul. 11, 2008  (KR) .................. 10-2008-0067628

(51) Int. Cl.
*B21D 53/10* (2006.01)
*B23H 3/00* (2006.01)

(52) U.S. Cl. ............. 29/898.02; 29/898.1; 29/898.13; 29/898.14; 205/649

(58) Field of Classification Search .......... 29/898, 29/898.02, 898.1, 898.13, 898.14; 205/640, 205/649, 661, 667
See application file for complete search history.

(56) References Cited

U.S. PATENT DOCUMENTS

| | | | |
|---|---|---|---|
| 6,425,954 B1 * | 7/2002 | Usui | 134/1 |
| 7,416,652 B2 * | 8/2008 | Oelsch | 205/640 |
| 7,507,039 B2 * | 3/2009 | Ueda et al. | 384/112 |
| 7,625,468 B2 * | 12/2009 | Parkhomovsky et al. | 204/224 M |
| 2003/0024122 A1 * | 2/2003 | Ichiyama et al. | 29/898 |
| 2007/0144917 A1 * | 6/2007 | Yasuda et al. | 205/649 |
| 2008/0181542 A1 * | 7/2008 | Gomyo | 384/100 |

FOREIGN PATENT DOCUMENTS

JP   2002322504 A   * 11/2002
JP   2006-316896      11/2006

* cited by examiner

*Primary Examiner* — Sarang Afzali

(57) ABSTRACT

Disclosed herein is a method of manufacturing a hydrodynamic bearing in which a metal bearing made of sintered metal powder is internally subjected to chemical etching, to form hydrodynamic pressure grooves thereon, thus assuring a high-precision and reliable hydrodynamic bearing. The method includes: compressing metal powder that is a raw material of the bearing in a press unit, and sintering the compressed metal powder at a predetermined temperature, thus preparing a sintered bearing; removing foreign substances adhering to the sintered bearing through a deburring process, and pressing the sintered bearing into a desired shape; forming a hydrodynamic groove, configured to generate hydrodynamic pressure, on an internal surface of the shaped bearing using chemical etching; and conducting a post treatment of cleaning the bearing including the hydrodynamic grooves thereon and drying the bearing.

1 Claim, 6 Drawing Sheets

METHOD OF MANUFACTURING
HYDRODYNAMIC BEARING

CROSS REFERENCE TO RELATED
APPLICATION

This application claims the benefit of Korean Patent Application No. 10-2008-0067628, filed Jul. 11, 2008, entitled "METHOD FOR MANUFACTURING THE HYDRODYNAMICS BEARING", which is hereby incorporated by reference in its entirety into this application.

BACKGROUND OF THE INVENTION

1. Field of the Invention

The present invention relates generally to a method of manufacturing a hydrodynamic bearing, and, more particularly, to a method of manufacturing a hydrodynamic bearing in which a metal bearing, which is prepared by sintering metal powder, is internally subjected to chemical etching, such as done by an electrochemical machining process or an etching process, to form hydrodynamic pressure grooves thereon, thus assuring a high-precision and reliable hydrodynamic bearing.

2. Description of the Related Art

The hydrodynamic bearing, which is intended to rotatably support a rotating shaft that is rotated by externally applied electric current, holds a predetermined type of fluid between the rotating shaft and the bearing. In order to assure the smooth rotation of the rotating shaft, fine hydrodynamic pressure grooves, which perform a hydrodynamic pumping action of the fluid, are provided between either the rotating shaft or the hydrodynamic bearing.

An example of the methods of manufacturing such a hydrodynamic bearing is disclosed in Japanese Unexamined Patent Publication No. 2006-316896, which is schematically illustrated in FIGS. 9 and 10.

As shown in FIG. 9, the conventional method of manufacturing a hydrodynamic bearing is conducted in such a manner that metal powder M, which is a raw material of a shaft-supporting sleeve, is compressed between an upper punch 14 and a lower punch 13 which are forcedly moved toward each other, and the resulting compressed body Ma is sintered at a predetermined temperature, resulting in a sintered bearing body 15.

Subsequently, as shown in FIG. 10, in order to form hydrodynamic grooves on the internal surface of the sintered body 15, the sintered body 15 is put into a press die 16, and a core rod 17, having thereon protrusions corresponding to the desired hydrodynamic grooves, is inserted into the internal space of the sintered body 15. Thereafter, the external surface of the sintered body 15 is pressed using the press die 16, with the result that the internal surface of the sintered body 15 is formed with the hydrodynamic grooves.

The core rod 17 is separated from the sintered body 15, and then the sintered body 15 is separated from the press die 16, thus producing a desired shaft-supporting sleeve.

However, in the above conventional method of manufacturing a shaft-supporting sleeve, when the core rod 17 is separated from the sintered body 15, the hydrodynamic grooves of the sintered body may be damaged due to the protrusions of the external surface of the core rod 17, thus causing uneven hydrodynamic pressure to occur.

Furthermore, since the sintered body 15 must be made of metal powder having a spring back behavior, the raw material of the sintered body 15 is inevitably selected from restricted kinds of materials.

In addition, since the hydrodynamic grooves are formed by pressing the sintered body 15 after the compression and sintering processes of the metal powder M, the compressed structure of the sintered body 15 is not dense, thus deteriorating the durability of the sintered body 15.

SUMMARY OF THE INVENTION

Accordingly, the present invention has been made keeping in mind the above problems occurring in the related art, and the present invention provides a method of manufacturing a hydrodynamic bearing, which is conducted in such a manner that a bearing is prepared by compressing and sintering metal powder at high pressure and temperature, and the bearing is subjected to an electrochemical machining process or an etching process to form hydrodynamic grooves on the internal surface of the bearing, thus providing a hydrodynamic bearing having durability and accuracy superior to those made by conventional methods.

In one aspect, the present invention provides a method of manufacturing a hydrodynamic bearing having an internal space and configured to exert hydrodynamic pressure between fluid and the bearing, including: compressing metal powder that is a raw material of the bearing in a press unit, and sintering the compressed metal powder at a predetermined temperature, thus preparing a sintered bearing; removing foreign substances adhering to the sintered bearing through a deburring process, and pressing the sintered bearing into a desired shape; forming a hydrodynamic groove, configured to generate hydrodynamic pressure, on an internal surface of the shaped bearing using chemical etching; and conducting a post treatment of cleaning the bearing including the hydrodynamic grooves thereon and drying the bearing.

In this method, forming the hydrodynamic groove may be conducted using electrochemical machining (EXM) in a manner that an electrode tool, having an electrode portion corresponding to the hydrodynamic groove, is inserted into the internal space of the shaped bearing, positive current is applied to the shaped bearing while negative current is applied to the electrode tool, and flowing electrolyte between the shaped bearing and the electrode tool.

The electrode tool may be covered with nonconductive insulating layer at a separate portion other than the electrode portion.

In forming the hydrodynamic groove, the shaped bearing may be covered with photoresist at an entire area other than an area at which the hydrodynamic groove is to be formed, and thus the area, at which the hydrodynamic groove is to be formed, is chemically etched.

The photoresist may be positive photoresist that is cured due to exposure to ultraviolet rays.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in greater detail with reference to the accompanying drawings.

Figure 1:
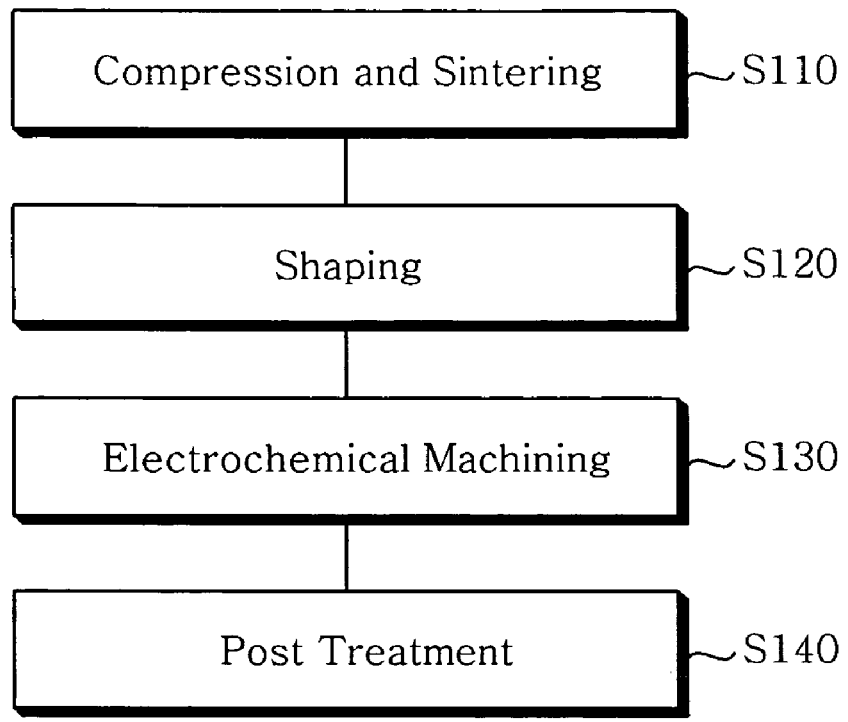
FIG. 1 is a schematic flowchart showing a method of manufacturing a hydrodynamic bearing, according to a first embodiment of the present invention.

As shown in FIG. 1, a method of manufacturing a hydrodynamic bearing, according to a first embodiment of the present invention comprises a process (S110) of compressing and sintering metal powder, a process (S120) of shaping the sintered material, a process (S130) of electrochemical machining the shaped material, and a process (S140) of post treatment. The respective processes of the method according to an embodiment of the present invention will now be described with reference to FIGS. 2 and 3.

Figure 2:
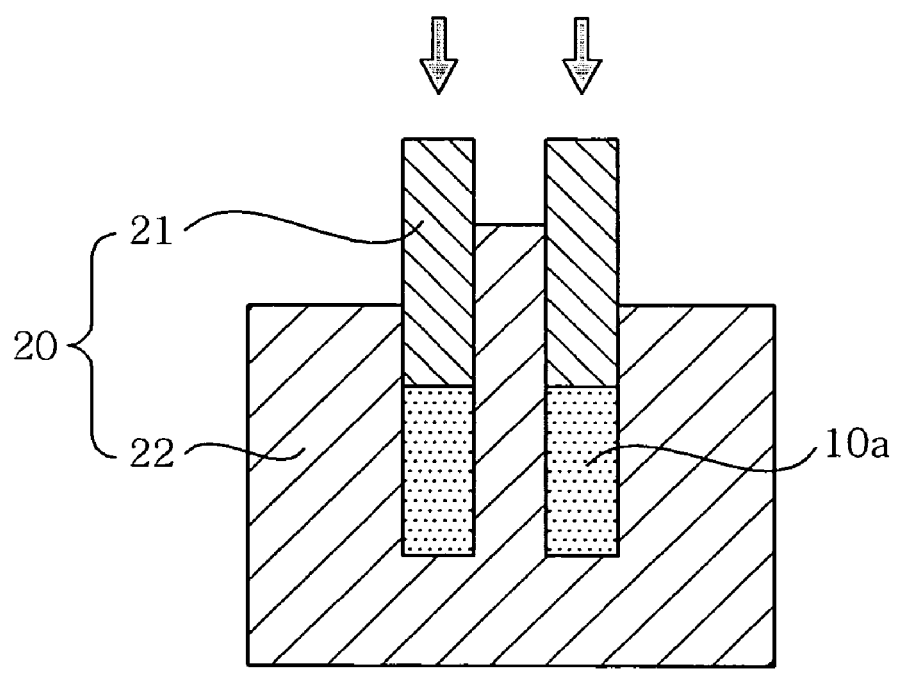
FIG. 2 is a schematic cross-sectional view showing compression and sintering processes in the method shown in FIG. 1.

As shown in FIG. 2, metal powder 10a is compressed and sintered to prepare a bearing 10 of a hydrodynamic bearing.

The metal powder 10a, which is used in the formation of the bearing 10, may be essentially composed of copper powder, copper alloy powder or a mixture of copper powder and iron powder, and may have an optional lubricant powder additive such as a stearin additive.

For the compression and molding of the metal powder 10a, metal powder 10a is loaded into a hollow space of a press unit 20 which is a combination of an upper press part 21 and a lower press part 22, and the metal powder 10a is compressed at a predetermined pressure using the upper press part 21. Thereafter, the metal powder 10a is sintered at a proper sintering temperature, thus preparing a sintered bearing 10.

Subsequently, a shaping process of removing unnecessary portions of the bearing 10, thus tailoring the bearing to a desired size, is performed. If required, the shaping process may be repeatedly conducted.

Thereafter, a deburring process is conducted in which unwanted portions, such as burrs which may be formed on external and internal surfaces of the sintered bearing 10, are eliminated using a deburring device. The bearing 10 is fitted in a predetermined mold, and then a predetermined pressure and stroke are applied to the bearing 10 for the process of shaping the bearing 10. At this point, the diameter of the external surface and the total height of the bearing 10 may be calibrated to the desired dimensions.

In consideration of frictional and cooling properties of the bearing, the shaping process may be conducted after the bearing 10 is dipped into shaping oil. In the case of dipping the bearing into shaping oil, an additional process of clearing away the shaping oil from the bearing 10 using an organic cleaning agent may be required. In the organic cleaning process, an ultrasonic organic cleaning, which is capable of completely removing the shaping oil from the bearing 10 by continuous application of ultrasonic waves to the bearing 10, may be employed.

After the organic cleaning, in order to eliminate the organic cleaning agent from the bearing 10, the bearing 10 is put into a separate oven and is sufficiently heated and dried at a temperature of 60° C. or higher for a period of one hour (S120).

Figure 3:
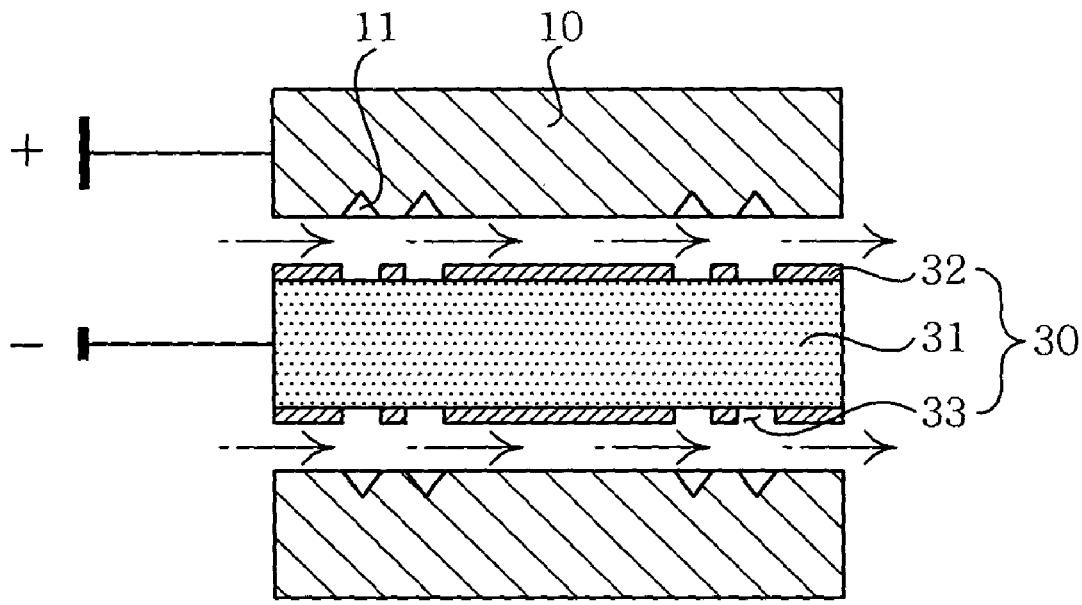
FIG. 3 is a schematic cross-sectional view showing electrochemical machining of a bearing using an electrode tool, according to the first embodiment of the present invention.

Subsequently, as shown in FIG. 3, the bearing 10 is subjected to an electrochemical machining (ECM) process, which is a kind of chemical etching processes, in order to form hydrodynamic grooves 11 on the external surface of the bearing 10.

The electrochemical machining (ECM) refers to an etching process of removing a metal oxide which results from electrochemical dissolution of a metal workpiece, thus forming fine grooves on the metal workpiece. More specifically, in order to form fine hydrodynamic grooves 11 at predetermined locations on the bearing 10, a positive current is applied to the bearing 10 while a negative current is applied to an electrode tool which is provided with a conductive pattern corresponding to the hydrodynamic grooves 11. Under these conditions, electrolyte is forced to flow between the bearing 10 and the electrode tool 30, thus forming the hydrodynamic grooves 11.

In this embodiment, the electrode tool 30 comprises an electrode matrix 31 to which the negative current is applied, and a nonconductive insulating layer 32 surrounding the electrode matrix 31 and having grooves corresponding to the hydrodynamic grooves 11. In other words, the electrochemical machining does not affect the region of the electrode tool 30 covered with the nonconductive insulating layer 32 but affects only the region of the electrode tool 30 which is exposed through the grooves of the nonconductive insulating layer 32 (S130).

Finally, the bearing 10, which includes the hydrodynamic grooves 11 formed thereon, is subjected to a post treatment process. In the post treatment process (S140), various successive processes are sequentially conducted, which include a cleaning process of removing electrolyte adhering to the bearing 10, an antirust process to prevent corrosion of the bearing 10 using antirust agent, a water washing process of removing electrolyte and other substances remaining on the surface of the bearing 10 using water, a vacuum drying process of removing moisture and oil remaining in pores of the bearing 10 by subjecting the bearing to vacuum drying at a temperature of 80° C. or higher, an organic cleaning process of clearing away oil and the like exuding from the surface of the bearing 10 using organic cleaning agent, and a drying process of removing the organic cleaning agent by drying the bearing 10 at a temperature of 60° C. or higher (S140).

As described above, since the method according to this embodiment of the present invention is conducted in such a manner that the bearing is sintered and then the sintered bearing 10 is subjected to the electrochemical machining to form hydrodynamic grooves 11 on the bearing 10, the method can enhance the durability of the bearing 10 itself and can prevent the breakdown of the hydrodynamic grooves 11.

Figure 4:
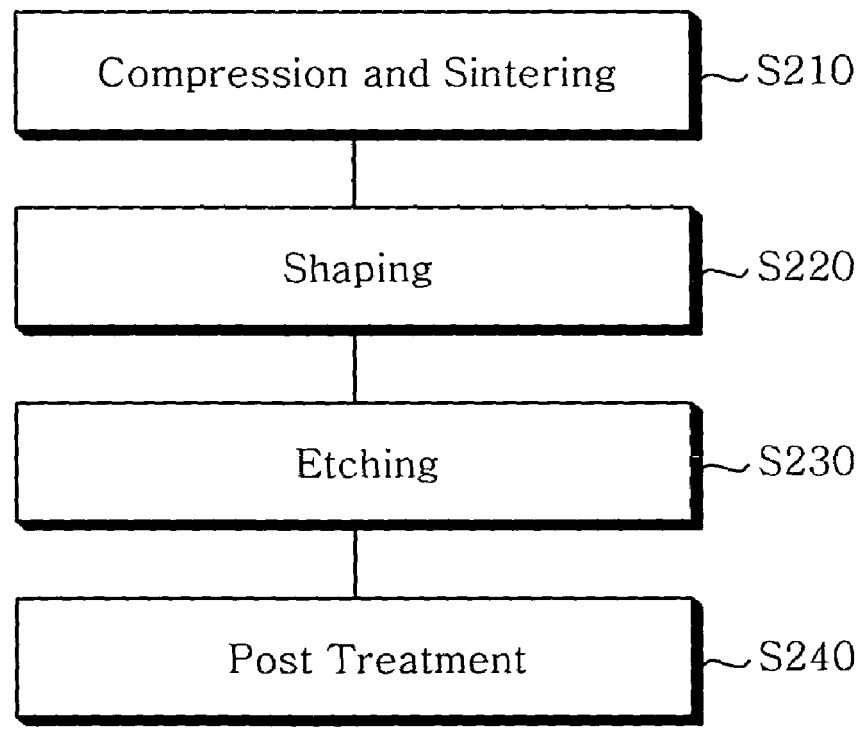
FIG. 4 is a schematic flowchart showing a method of manufacturing a hydrodynamic bearing, according to a second embodiment of the present invention.

As shown in FIG. 4, a method of manufacturing a hydrodynamic bearing, according to a second embodiment of the present invention comprises a process (S210) of compressing and sintering metal powder, a process (S220) of shaping the sintered material, a process (S230) of etching the shaped material, and a process (S240) of post treatment. The respective processes of the method according to a second embodiment of the present invention will now be described with reference to FIGS. 5 to 8.

Figure 5:
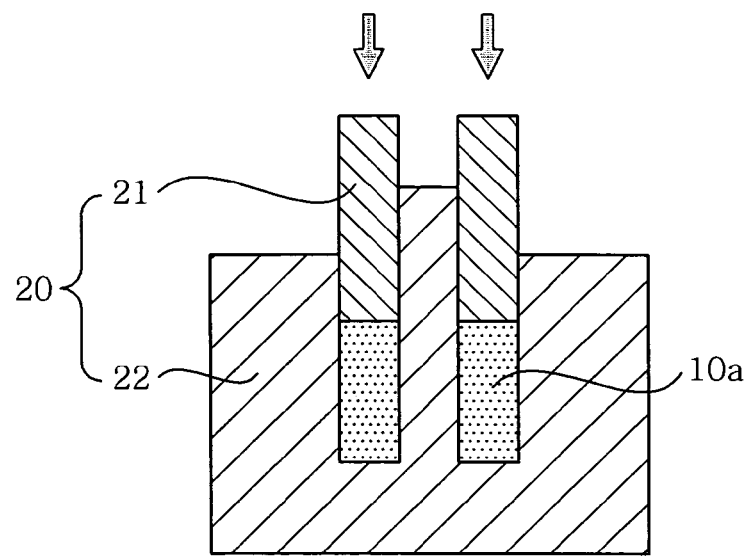
FIG. 5 is a schematic cross-sectional view showing compression and sintering processes in the method shown in FIG. 4.

As shown in FIG. 5, metal powder 10a is compressed and sintered to prepare a bearing 10 of a hydrodynamic bearing.

The metal powder 10a, which is used in the formation of the bearing 10, may be essentially composed of copper powder, copper alloy powder or a mixture of copper powder and iron powder, and lubricant powder such as a stearin additive may be optionally added thereto.

For the compression and molding of the metal powder 10a, metal powder 10a is loaded into a hollow space of a press unit 20 which is a combination of an upper press part 21 and a lower press part 22, and the metal powder 10a is compressed at a predetermined pressure using the upper press part 21. Thereafter, the metal powder 10a is sintered at a proper sintering temperature, thus preparing a sintered bearing 10.

Subsequently, a shaping process of removing unnecessary portions of the bearing 10, thus tailoring the bearing to a desired size, is conducted. The shaping process may be repeatedly conducted, if required.

Thereafter, a deburring process is conducted in which unwanted portions, such as burrs, which may be formed on external and internal surfaces of the sintered bearing 10, are eliminated using a deburring device. The bearing 10 is fitted in a predetermined mold, and then a predetermined pressure and stroke are applied to the bearing 10 for the shaping of the bearing 10. At this point, the diameter of the external surface and the total height of the bearing 10 may be calibrated to the desired dimensions.

In consideration of frictional and cooling properties of the bearing, the shaping process may be conducted after the bearing 10 is dipped into shaping oil. In the case of dipping the bearing into shaping oil, an additional process of clearing away the shaping oil from the bearing 10 using organic cleaning agent may be required. In the organic cleaning process, an ultrasonic organic cleaning, which is capable of completely removing the shaping oil from the bearing 10 by continuously applying ultrasonic waves to the bearing 10, may be employed.

After the organic cleaning, in order to eliminate the organic cleaning agent from the bearing 10, the bearing 10 is put into a separate oven and is sufficiently heated and dried at a temperature of 60° C. or higher for a period of one hour (S120).

Figure 6:
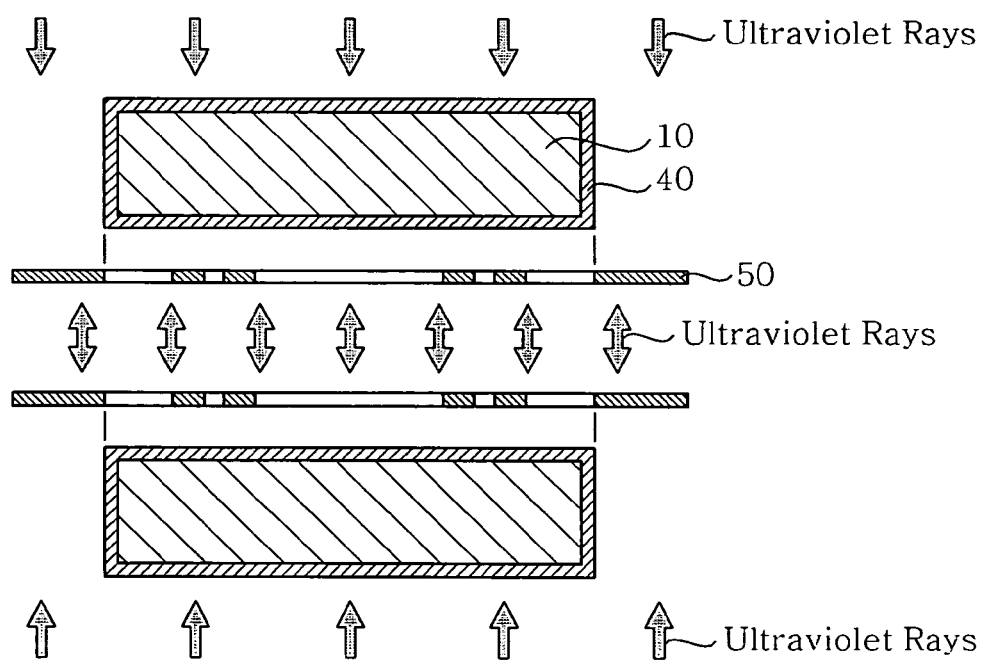
FIGS. 6 to 8 are cross-sectional views showing a process of forming hydrodynamic grooves on a bearing using etching, according to the second embodiment of the present invention.
Figure 7:
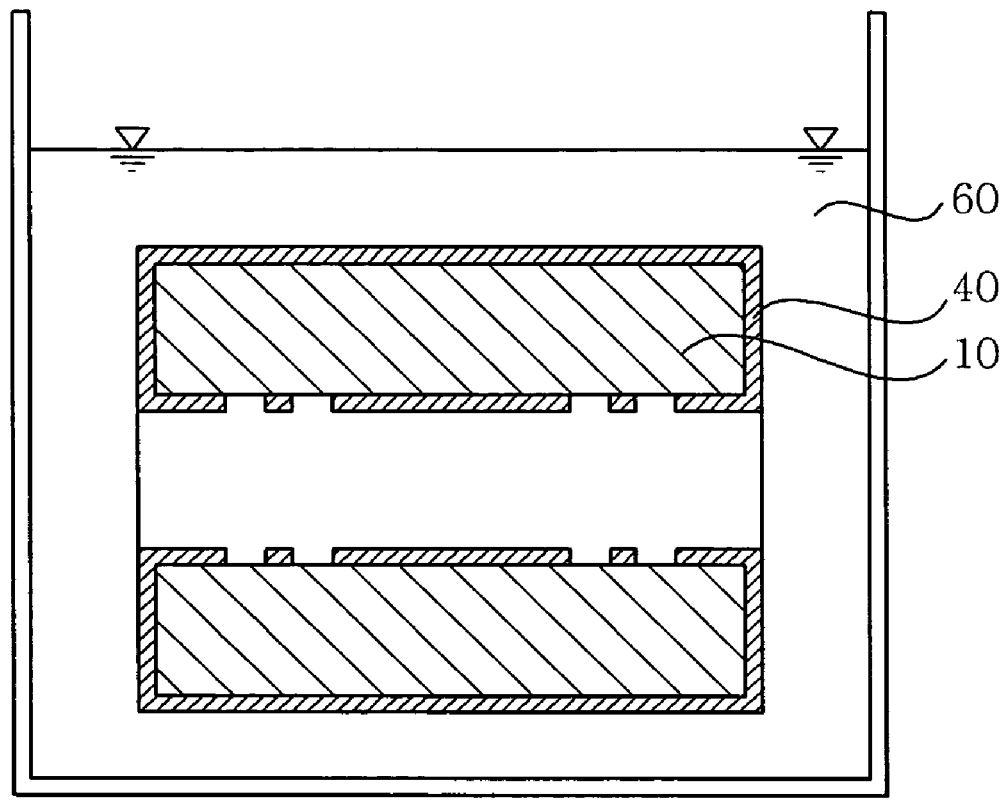
Figure 8:
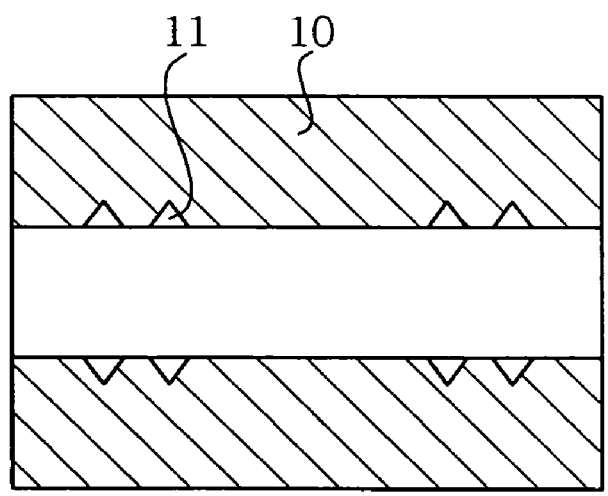
Figure 9:
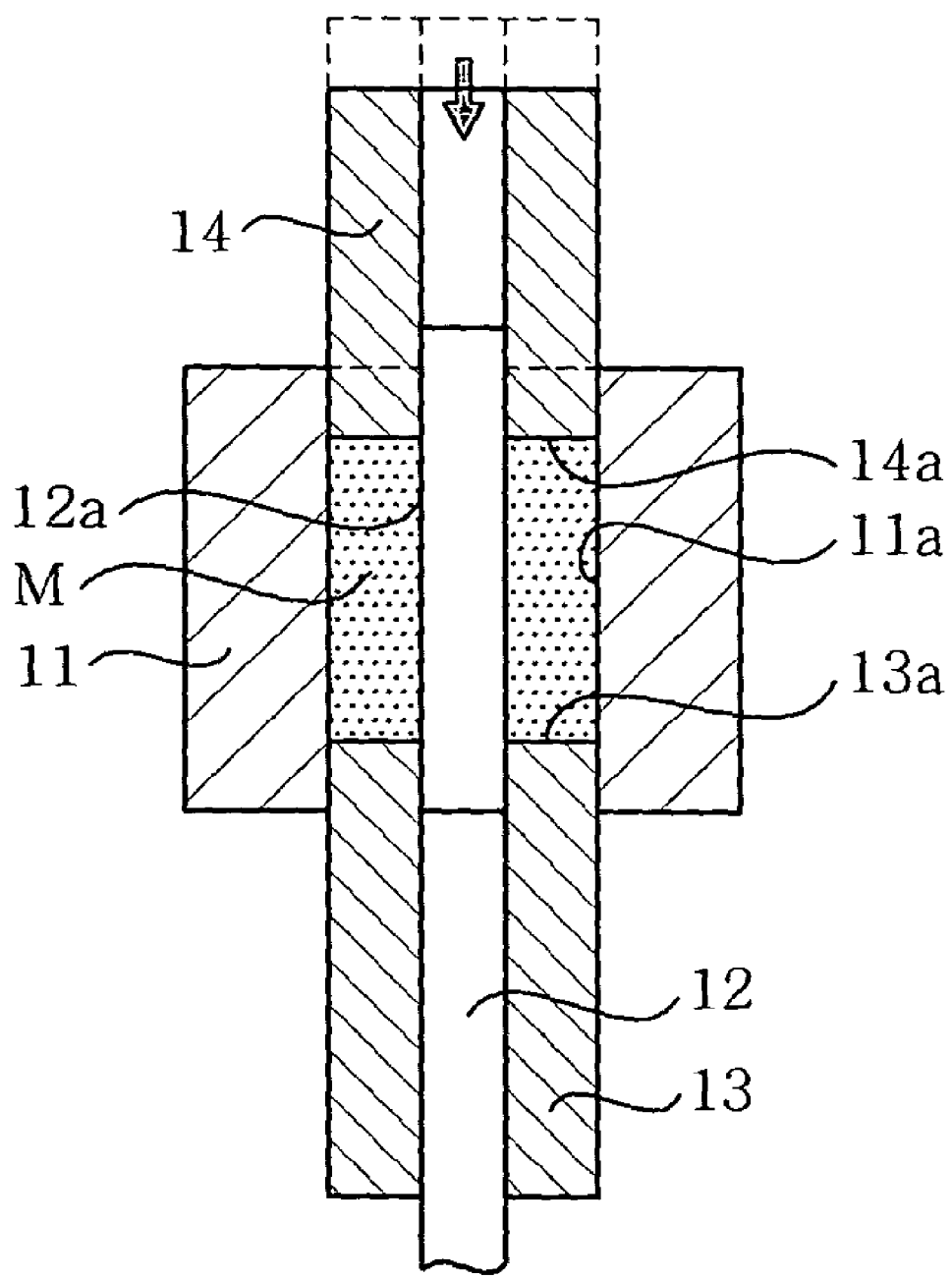
FIGS. 9 and 10 are schematic cross-sectional views showing a conventional process of manufacturing a hydrodynamic bearing.
Figure 10:
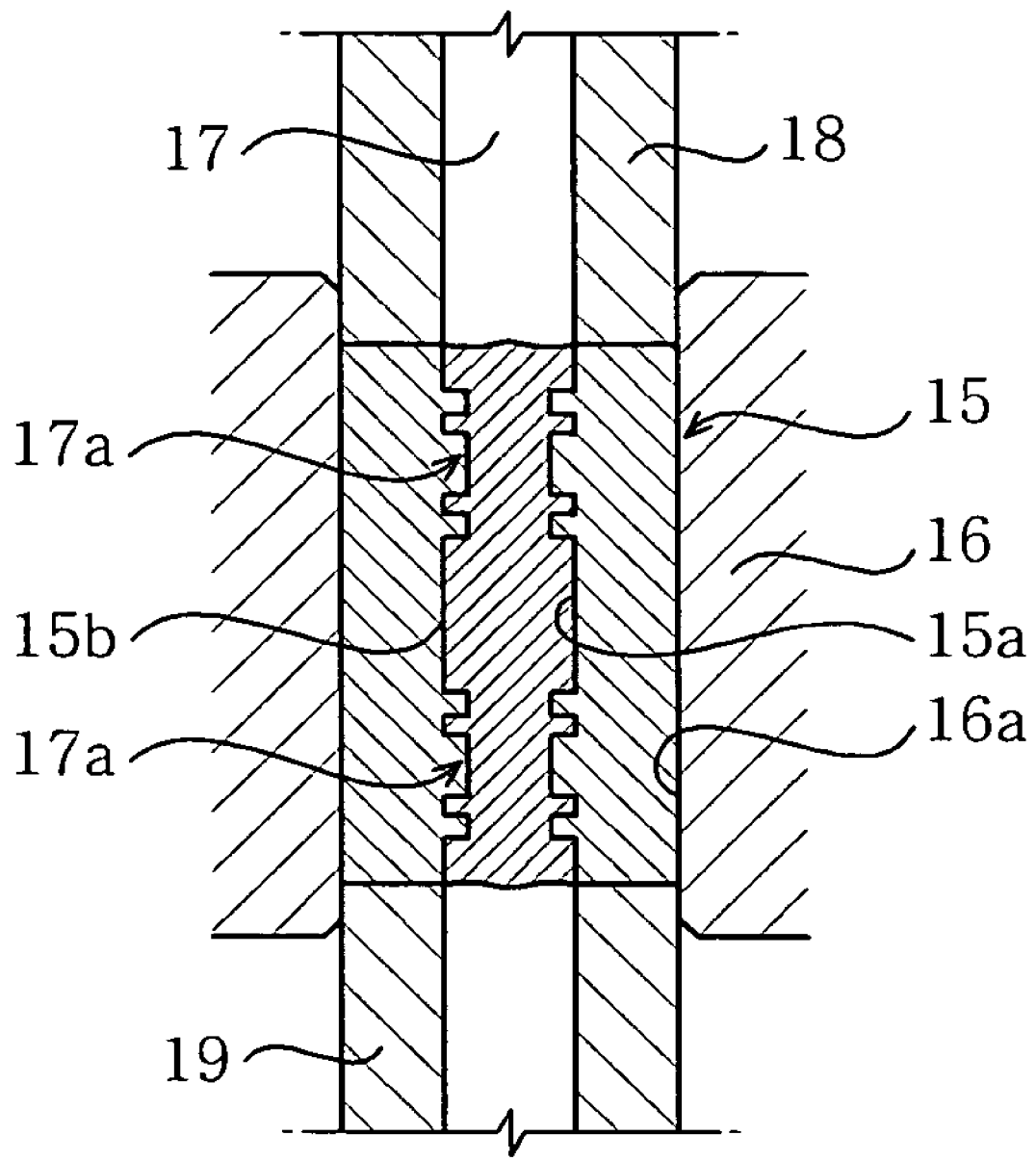

Subsequently, as shown in FIGS. 6 to 8, the bearing 10 is subjected to an etching process, which is a kind of chemical etching processes, in order to form hydrodynamic grooves 11 on the external surface of the bearing 10.

The etching process refers to an etching process of removing a metal oxide which results from electrochemical dissolution of a metal workpiece, thus forming fine grooves on the metal workpiece. More specifically, in order to form fine hydrodynamic grooves 11 at predetermined locations on the bearing 10, the bearing is covered with photoresist or a dry film 40 such that regions of the bearing 10, at which the fine hydrodynamic grooves 11 are formed later, are exposed. The regions of the bearing 10, at which the hydrodynamic grooves 11 are formed, are etched using etchant.

As shown in FIG. 6, photoresist is applied to the bearing 10 such that the bearing 10 is completely covered with the photoresist 40. In this embodiment, the photoresist 40 may be positive photoresist which is cured by exposure to ultraviolet rays. Prior to the exposure to ultraviolet rays, in order to remove the regions of the photoresist 40, which correspond to the hydrodynamic grooves 11 on the internal surface of the bearing 10, a masking member 50 is inserted into the internal space of the bearing 10 such that the regions of the photoresist 40 which correspond to the hydrodynamic grooves 11 are not exposed to ultraviolet rays. More specifically, the masking member 50 is configured such that the regions of the masking member 50, corresponding to the hydrodynamic grooves 11, remain uncut so as not to allow the regions of the photoresist 40 corresponding to the hydrodynamic grooves 11 to be cured by the exposure to ultraviolet rays whereas the other regions of the masking member 50 are cut away so as to allow the other regions of the photoresist 40 to be exposed to the ultraviolet rays.

As shown in FIG. 7, after the photoresist 40 is exposed to ultraviolet rays and is thus cured, the regions of the photoresist 40, corresponding to the hydrodynamic grooves 11, i.e., the uncured regions of the photoresist 40 are removed, and the entire bearing 10 is completely immersed into etching solution 60, with the result that the hydrodynamic grooves 11 are formed on the bearing 10. Subsequently, as shown in FIG. 8, the bearing 10, which includes the hydrodynamic grooves 11 formed on the internal surface thereof, is pulled out of the etching solution 60, and then the photoresist 40 surrounding the entire bearing 10 is removed from the bearing (S230).

Finally, the bearing 10, which is formed with the hydrodynamic grooves 11, is subjected to the post treatment. In the post treatment, various successive processes are sequentially conducted, which include a cleaning process of removing electrolyte adhering to the bearing 10, an antirust process to prevent corrosion of the bearing 10 using antirust agent, a water washing process of removing electrolyte and other substances remaining on the surface of the bearing 10 using water, a vacuum drying process of removing moisture and oil remaining in pores of the bearing 10 by subjecting the bearing to vacuum drying at a temperature of 80° C. or higher, an organic cleaning process of clearing away oil and the like exuding from the surface of the bearing 10 using organic cleaning agent, and a drying process of removing the organic cleaning agent by drying the bearing 10 at a temperature of 60° C. or higher (S240).

As described above, since the method according to this embodiment of the present invention is conducted in such a manner that the bearing is sintered and then the sintered bearing 10 is subjected to the etching to form hydrodynamic grooves 11 on the bearing 10, the method can enhance the durability of the bearing 10 itself and can prevent the breakage of the hydrodynamic grooves 11.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing a hydrodynamic bearing having an internal space and configured to exert hydrodynamic pressure between fluid and the bearing, comprising:
    compressing metal powder that is a raw material of the bearing in a press unit, and sintering the compressed metal powder at a predetermined temperature, thus preparing a sintered bearing;
    removing foreign substances adhering to the sintered bearing through a deburring process, and pressing the sintered bearing into a desired shape;
    forming a hydrodynamic groove using electrochemical machining (ECM) in a manner that an electrode tool, having an electrode portion corresponding to the hydrodynamic groove, is inserted into the internal space of the shaped bearing, positive current is applied to the shaped bearing while negative current is applied to the electrode tool, and flowing electrolyte between the shaped bearing and the electrode tool; and
    conducting a post treatment of the bearing formed with the hydrodynamic groove thereon, the post treatment including a cleaning process to remove electrolyte adhering to the bearing, an antirust process to prevent corrosion of the bearing using antirust agent, a vacuum drying process at a temperature of 80° C. or higher, an organic cleaning process to clean the bearing, and a drying process to dry the bearing at a temperature of 60° C. or higher.

\* \* \* \* \*